United States Patent [19]

Selby

[11] Patent Number: 4,823,635
[45] Date of Patent: Apr. 25, 1989

[54] SHIFT LEVER STOWING DEVICE

[76] Inventor: Charles R. Selby, 1710 F Rd., Delta, Colo. 81416

[21] Appl. No.: 153,360

[22] Filed: Feb. 8, 1988

Related U.S. Application Data

[63] Continuation-in-part of Ser. No. 000,737, Jan. 5, 1987, abandoned.

[51] Int. Cl.⁴ .............................................. G05G 1/04
[52] U.S. Cl. ...................... 74/524; 74/547; 74/543; 74/526
[58] Field of Search .............. 74/543, 545–548, 74/551.3, 523, 524, 525, 473 R, 473 P, 526; 180/336; 403/61, 101, 102; 70/205, 247

[56] References Cited

U.S. PATENT DOCUMENTS

| | | | |
|---|---|---|---|
| 691,670 | 1/1902 | Shipley | 74/524 |
| 987,804 | 3/1911 | Howard | 74/524 |
| 1,059,884 | 4/1913 | Link | 74/547 |
| 1,301,475 | 4/1919 | Mellin | 74/524 X |
| 1,724,694 | 8/1929 | Chamberlain | 74/547 X |
| 1,743,241 | 1/1930 | Schmidt | 74/524 |
| 1,828,980 | 10/1931 | Nixon et al. | 74/547 |
| 1,870,403 | 8/1932 | Coffing | 74/547 |
| 2,042,789 | 6/1936 | Kuckuck | 74/524 X |
| 2,524,508 | 10/1950 | Barnes | 74/524 X |
| 2,556,995 | 6/1951 | Coffing | 74/524 X |
| 3,680,448 | 8/1972 | Ballingall et al. | 403/102 X |
| 4,267,747 | 5/1981 | Wallace et al. | 74/526 |
| 4,281,526 | 8/1981 | Lipschutz | 74/524 X |

FOREIGN PATENT DOCUMENTS

| | | | |
|---|---|---|---|
| 1944173 | 3/1971 | Fed. Rep. of Germany | 74/543 |
| 259156 | 6/1928 | Italy | 74/524 |
| 0066068 | 4/1982 | Japan | 74/524 |

Primary Examiner—Richard E. Moore
Assistant Examiner—Vinh Luong
Attorney, Agent, or Firm—John E. Holder; Donald W. Erickson

[57] ABSTRACT

A mechanism for permitting a shift lever to be stowed away when it is not being used to operate a shiftable mechanism in a motor vehicle. The mechanism may be attached to shifting apparatus already in place in a vehicle or provided as original equipment. The mechanism has first and second portions that are slidably arranged so that in a first position the shift lever is rigidly connected to the shiftable mechanism and in a second position the shift lever is moved to an out of the way, (stowed position), near the floor of the vehicle. A slot on one of the sliding portions and a pair of pins on the other sliding portion are arranged to permit easy selective movement from the rigid to the stowed position. A biasing spring is connected between the sliding portions to releasably hold the lever in which ever position it is moved to.

7 Claims, 2 Drawing Sheets

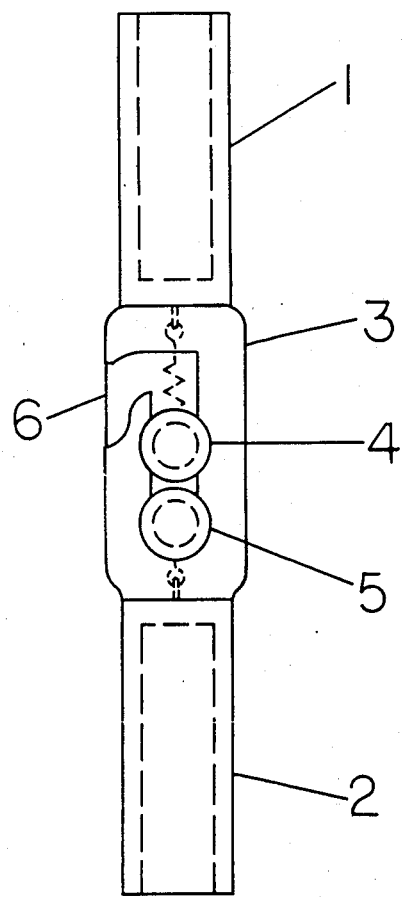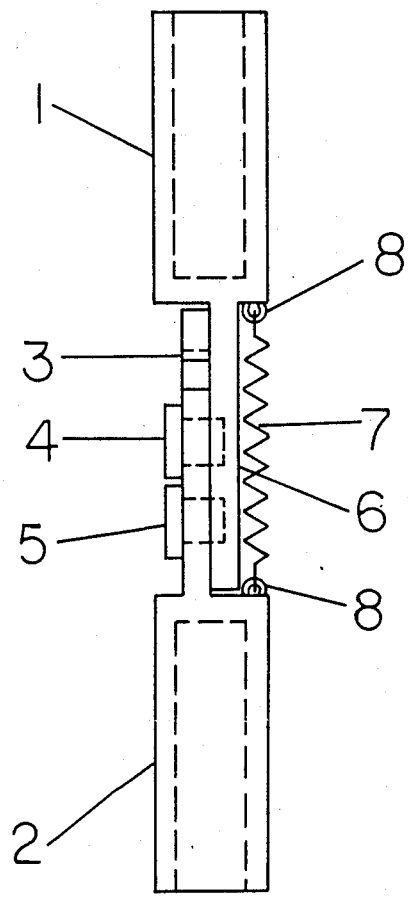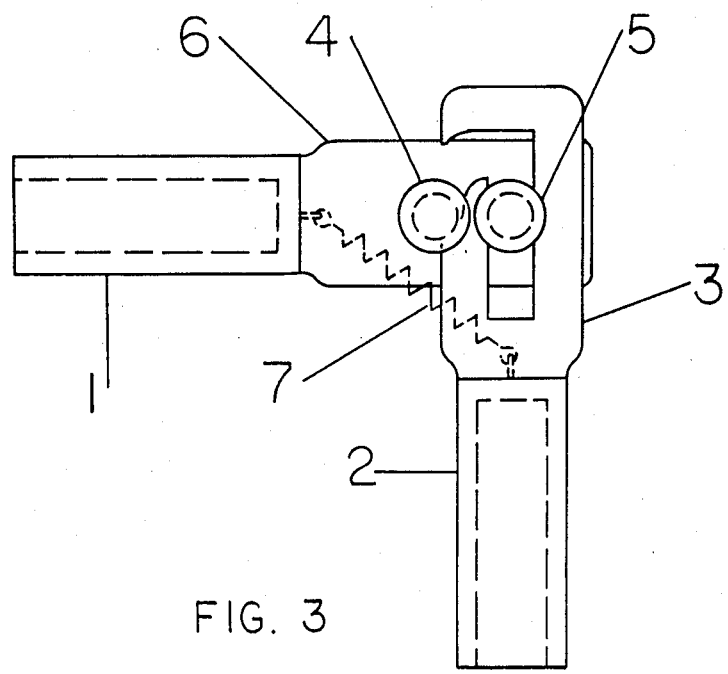

SHIFT LEVER STOWING DEVICE

CROSS-REFERENCE TO RELATED APPLICATION

This application is a continuation-in-part of Ser. No. 000,737, filed Jan. 5, 1987, now abandoned, entitled "GEARSHIFT LEVER DEVICE".

BACKGROUND OF THE INVENTION

The present invention pertains to a shift lever and more particularly to a device for permitting a shift lever to be stowed away for facilitating other uses of the space in which the shift lever is normally positioned.

History of the Prior Art

In motor vehicles utilizing a shift mechanism which is positioned on the floor of the vehicle in the space between the driver and passenger's side of the vehicle, it is well known that the shift mechanism often prevents convenient use of this space for carrying passengers or cargo. This is particularly true when there is more than one shift lever positioned in this space as may be the case when the vehicle is equipped with four wheel drive or rear end shift mechanisms.

The placement of such mechanisms is dictated by their functional connection to the mechanism to be shifted and the position of the driver in the vehicle. Other than trying to locate the shift levers as much as possible to the periphery of the space so dictated by functional parameters, no successful attempts have been made to solve the problem presented by this situation.

It is therefore an object of the present invention to provide a new and improved shift lever which permits convenient movement of the lever to a stowed, out of the way position.

Summary of the Invention

With this and other objects in view, the present invention contemplates a shift lever mechanism which is easily connected to a previously existing shift lever in a vehicle and includes first and second relatively movable portions that are normally held in a first rigid position for shifting a mechanism and which may be moved first longitudinally and then transversely with respect to one another to a second, stowed position. An arrangement of a pair of pins moving within a unitary slot permits this movement in a short space and with a small force applied by the operator, while at the same time providing a positive lock of the shifting mechanism in its operative position, when the disengaging sequence of movement between the relatively moving portions is not applied. A biasing device holds the lever in both its operative and stowed positions absent the application of the correct series of motions to move the pins within the slots to allow movement of the first portion of the lever to a stowed position or visa versa.

BRIEF DESCRIPTION OF THE DRAWINGS

For a more complete understanding of the present invention, and for further objects and advantages thereof, reference may now be had to the following description when taken in conjunction with the accompanying drawings in which:

FIG. 1 is a side elevation view of a shift lever mechanism;

FIG. 2 is a front elevation view of the shift lever mechanism of FIG. 1;

FIG. 3 is a side elevation view of the shift lever mechanism of FIG. 1 with the shift lever moved to a stowed position;

DETAILED DESCRIPTION OF THE PREFERRED EMBODIMENTS

Figure 4:
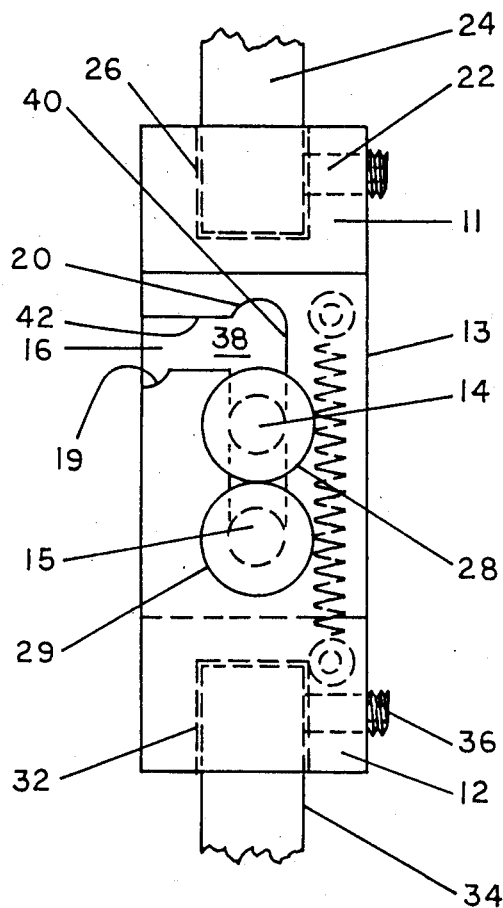
FIG. 4 is a side elevation view of another embodiment of a shift lever mechanism.

Referring first to FIGS. 1 and 2 of the drawings, there is shown a shift lever mechanism having an upper lever portion 1 arranged for connecting to a gear shift lever (not shown) of the type used in automotive vehicles to shift transmission gears or to shift a vehicle from a two wheel drive configuration to a four wheel drive configuration. A lower lever portion 2 is likewise arranged for connecting to a mechanism to be operated by the lever mechanism. If the shift lever stowing device of the present invention were to be retrofitted to an already existing automotive lever as opposed to being installed as original equipment, it could be accomplished readily and simply by cutting the existing lever in two parts and attaching the upper part of the shift lever, which normally has a knob for grasping by the operator, to the upper lever portion 1. Attachment to the shift lever can be accomplished in a variety of ways, such as by utilizing a set screw (not shown) transversely positioned in the wall of the lever portion 1 to clamp onto the upper part of the shift lever. The lower lever position 2 would then be similarly connected to the lower part of the shift lever, connected in turn to the mechanism to be shifted. A depending flat portion 6 formed at the lower end of lever portion 1 has pin assemblies 4 and 5 extending transversely outwardly from one side thereof. Each of the pin assemblies has a broadened head portion which has a diameter substantially larger than the body of the pin assembly as will be more particularly shown and described with respect to FIG. 4 of the drawings. An upwardly extending flat portion 3 formed on the upper end of lower lever portion 2 has a flat surface that fits against a mating flat surface on depending flat portion 6, from which pin assemblies 4 and 5 extend. The flat portion 3 has a slot formed therein which appears as an upsidedown and backward "L" in FIG. 1. The pin assemblies 4 and 5 are arranged to be positioned within and move through the slot with the broadened head on the pin assemblies holding the pin assemblies and slot in assembly and thus keeping the flat mating surfaces of the upper and lower lever portions 1 and 2 respectively in sliding contact. An eyelet 8 is positioned on the lower end of upper lever portion 1 where the depending portion 6 begins to extend downwardly from the lever portion. Another eyelet 8 is positioned at a similar facing surface of the lower lever portion 2. A coil spring or similar biasing device is connected between the eyelets to urge the upper and lower lever portions and the assembly of connected parts to remain in the positional configuration shown in FIGS. 1 and 2.

FIG. 3 of the drawings shows the mechanism described above in its stowed position whereby if a shifting lever were inserted into the lever portion 1 the shifting lever would be laid down on the floor surface of the vehicle. In order to operate the mechanism to the configuration of FIG. 3, it is only necessary for an operator to apply a force upwardly through the shift lever (not shown) to the upper lever portion 1, which in turn moves the flat portion 6 and pin assemblies 4 and 5 upwardly in the slot. The force required to accomplish this movement is only that required to overcome the weight of the upper lever portion and the affect of spring 7. When the pin assembly 4 is opposite the transverse portion of the slot, the lever portion 1 can be rotated transversely to lay the lever portion 1 and depending flat portion 6 over on their side and thus lay the shift lever on the floor. The short slot and double pin arrangement of this mechanism permits this to be accomplished in a short lineal span which is important in this application in that it is desirable to maintain the breakover point of the mechanism near the floor of the vehicle to make the space above it more usable.

Figure 5:
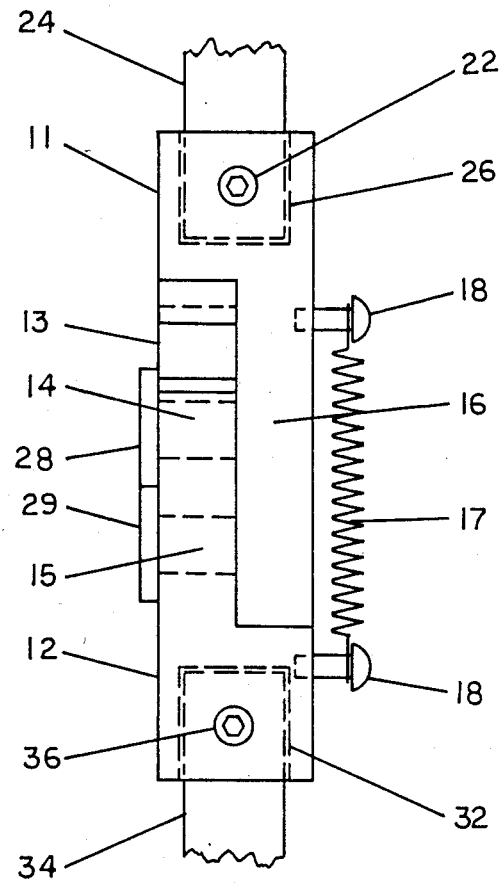
FIG. 5 is a front view of the shift lever mechanism of FIG. 4.

Referring now to FIGS. 4 and 5 of the drawings, an alternative embodiment of the invention is shown. An upper lever portion 11 is shown having cylindrical cavity 26 formed therein for receiving the lower end 24 of a shift lever. A set screw 22 or the like is shown extending through the wall of the lever portion 11 into communication with the cavity 26 to clamp the lever portion 1 onto the lower end 24 of a shift lever. The upper lever portion 11 has a flat shank 16 extending downwardly therefrom. A pair of pins 14 and 15 are shown extending transversely outwardly from one side of the shank 16. A flat circular head 28 and 29 respectively is formed on each of the pins 14 and 15. The heads 28,29 are sized such that their circumferential edges touch one another. This provides stability to the structure. The heads 28,29 are also made larger than the width of the slot 38 and its portions so that the heads serve to hold the parts in assembly. The pins 14,15 are also spaced so that by careful manipulation of the lever portions 11 and 12, the pins may be moved through the slot 38 until the lever portions are disassembled, thus reversedly permitting their convenient assembly when manufactured.

A lower lever portion 12 is shown having a cylindrical cavity 32 for receiving an upwardly extending shaft 34 connecting with a mechanism to be shifted by the shift lever apparatus. A set screw 36 is shown extending through the wall of lever portion 12 for clamping the lever portion 12 to the shaft 34. Were the shift lever apparatus retrofitted to an already existing shift lever, the shift lever 24 and shaft 34 would be the upper and lower sections of a gear shift lever that had been cut into for inserting into the cylindrical cavities 26, 32 respectively.

The lower lever portion 12 has an upwardly extending shank portion 13 with a slot 38 extending through the wall of shank portion 13. The slot 38 has a longitudinal portion 40 with a radius at each end of the longitudinal portion 40. A transverse slot portion 42 extends from the longitudinal portion 40 of the slot to the exterior of the shank 13. The transverse slot portion 42 intersects the longitudinal portion 40 just below the radius 20 on the upper end of longitudinal portion 40. At the outer end of transverse slot portion 42, a small radius section 19 is cut into the shank 13. The radii 20 and 19 are shaped to matingly receive the cylindrical pins 14 and 15. Metallic drive screws 18 or the like are positioned in the side walls of upper and lower lever portions 11 and 12 and extend outwardly therefrom on one side of the apparatus to accommodate the connection of a spring 17 between the lever portions 11 and 12.

Figure 6:
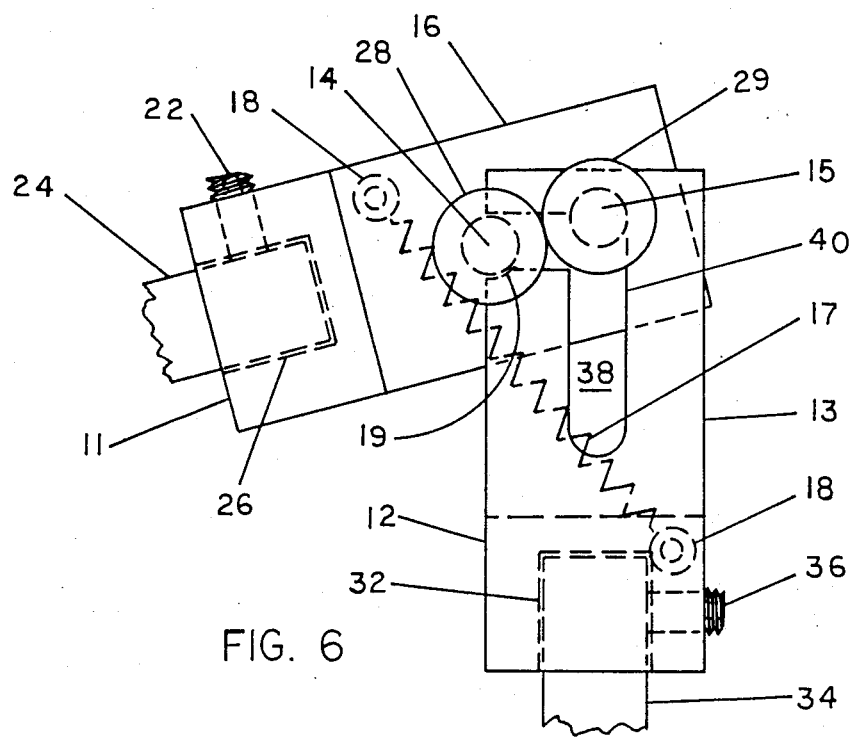
FIG. 6 is a side elevation view of the shift lever mechanism of FIG. 4 moved to a stowed position.

In the operation of the apparatus shown in FIGS. 4 and 5, a manipulating force may be applied in a generally sideways or transverse direction to shift a shiftable mechanism such as a transmission from one position to another. The mechanism as shown in FIGS. 4 and 5 is arranged to transmit such motion from the lever end 24 to the shaft 34 to accomplish the desired shifting action. If it becomes preferable to move the upper end of the shifting apparatus out of the way for any reason, the operator of the device may apply an upward force of a magnitude greater than the combined force of the weight of the upper lever portion 11 and connected parts, the shift lever 24 and the force of spring 17 to move the shank 16 up relative to shank 13. This in turn will cause the pins 14 and 15 to move upwardly in longitudinal slot portion 40 until pin 14 is aligned with the transverse slot portion 42. At this point, if the operator is applying a concurrent transverse force in the direction of slot portion 42, the pin 14 will move into slot portion 42 toward the exterior of shank 13 until pin 15 is received in the radius 20 at the upper end of longitudinal slot portion 40. At the same time, pin 14 will move onto the radius 19 at the outer surface of the shank 13. The spring 17 will now be urging the lever portions 11 and 12 into the configuration shown in FIG. 6 with the pins 14 and 15 being set in the radii 19,20 respectively, so that until a removing force is applied rotatively upwardly to the upper lever portion 11, the mechanism will remain as shown in FIG. 6. It is readily seen that the spring 17 can be replaced with any type of biasing device which will functionally serve the purpose of spring 17. The heads 28 and 29 on pins 14 and 15 respectively serve to maintain the parts in assembly but will permit the parts to be completely separated when the proper force is applied against the action of biasing spring 17.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

What is claimed is:

1. In a shift apparatus having a shift lever, improved means for easily moving a lever portion, to a stowed position, which improved means comprises:
   lever means arranged for connecting with the shift lever, said lever means having first and second lever portions arranged for movement relative to one another;
   slot means provided on one of said first and second lever portions, said slot means being a single unitary slot and having a longitudinal slot portion and a transverse slot portion arranged to have one of its ends intersect said longitudinal slot portion at a substantially right angle between the ends of said longitudinal slot portion thereby providing first and second end parts of said longitudinal slot portion on either side respectively of the intersection of said transverse slot portion with said longitudinal slot portion;
   pin means provided on the other of said first and second lever portions, said pin means having a portion sized to be matingly received within one of said end parts of said longitudinal slot portion; and bias means connected between said first and second lever portions for urging said lever portions to a first relative position, said slot means and pin means being arranged to permit relative movement of said first and second lever portions from the first relative position to a second relative position upon the application of force to one of said lever portions to thereby overcome urging of the bias means connected between said lever portions.

2. The apparatus of claim 1 wherein said pin means is comprised of a pair of pins spaced from one another at a distance less than the length of said longitudinal slot portion.

3. The apparatus of claim 2 wherein the pins are spaced from one another at a distance greater than the length of said transverse slot portion.

4. The apparatus of claim 1 wherein said transverse slot portion has one end terminating in the longitudinal slot portion and its other end terminating to an exterior edge of one said first and second lever portions.

5. The apparatus of claim 1 wherein said pin means is comprised of a pair of pins spaced from one another at a distance less than the length of said longitudinal slot portion and wherein said first end part of said slot is sized to matingly receive a portion of one of said pins.

6. The apparatus of claim 5 wherein said transverse slot portion includes a beveled edge portion at its other end terminating to an exterior edge of one of said first and second lever portions.

7. The apparatus of claim 6 wherein when one of said pins is matingly received in said first end part of said longitudinal slot portion, the other of said pins is positioned on said beveled edge portion of said transverse slot portion.

* * * * *